United States Patent
Childs et al.

(10) Patent No.: US 10,523,119 B2
(45) Date of Patent: Dec. 31, 2019

(54) COMPENSATION RAMP OFFSET REMOVAL

(71) Applicant: Dialog Semiconductor (UK) Limited, London (GB)

(72) Inventors: Mark Childs, Swindon (GB); Jens Masuch, Munich (DE)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 15/641,362

(22) Filed: Jul. 5, 2017

(65) Prior Publication Data

US 2019/0013732 A1 Jan. 10, 2019

(51) Int. Cl.
*H02M 3/156* (2006.01)
*H02M 3/158* (2006.01)
*H02M 1/08* (2006.01)

(52) U.S. Cl.
CPC .......... *H02M 3/158* (2013.01); *H02M 3/1582* (2013.01)

(58) Field of Classification Search
CPC ......... H02M 3/156; H02M 2003/1566; H02M 3/158; H02M 3/1582; H02M 2003/1586; H02M 3/1588; H02M 1/08
See application file for complete search history.

(56) References Cited

U.S. PATENT DOCUMENTS

| 6,903,537 | B2 | 6/2005 | Tzeng et al. |
| 7,107,468 | B2 | 9/2006 | Pullen et al. |
| 7,541,794 | B2 | 6/2009 | Tabaian et al. |
| 7,605,574 | B2 * | 10/2009 | Dearn .................... H02M 3/156 323/282 |
| 7,710,094 | B1 * | 5/2010 | Wong .................... H02M 3/156 323/225 |
| 7,791,321 | B2 | 9/2010 | Xu et al. |
| 7,936,160 | B1 * | 5/2011 | Sheehan ............... H02M 3/156 323/222 |

(Continued)

OTHER PUBLICATIONS

Related German Application DE 10 2016 217 857.1, DS15-021, "Peak Current Servo," filed Sep. 19, 2016, Mark Childs et al., Assignee: Dialog Semiconductor (UK) Ltd.

*Primary Examiner* — Gary L Laxton
*Assistant Examiner* — Sisay G Tiku
(74) *Attorney, Agent, or Firm* — Saile Ackerman LLC; Stephen B. Ackerman (57) ABSTRACT

A DC-DC current-control mode switching converter is disclosed, with peak-mode control circuitry, configured to compare a coil current to a variable current limit, to turn off a high side device when the coil current exceeds the variable current limit. The DC-DC switching converter includes a compensation ramp generator, configured to provide a compensation ramp signal, and an offset circuit, configured to provide an offset current. The DC-DC switching converter further includes an amplifier, configured to generate a control current proportional to the difference between an output voltage and a target voltage, and an adder, to combine the control current, the compensation ramp signal, and the offset current. A DC-DC current-control mode switching converter, with valley-mode control circuitry, configured to compare a coil current to a variable current limit, to turn off a low side device when the coil current falls below the variable current limit, is also disclosed.

39 Claims, 6 Drawing Sheets

(56) References Cited

U.S. PATENT DOCUMENTS

| | | | | |
|---|---|---|---|---|
| 9,780,662 B1* | 10/2017 | Milanesi | | H02M 3/158 |
| 2007/0279025 A1* | 12/2007 | Xu | | H02M 3/1588 |
| | | | | 323/282 |
| 2008/0084196 A1* | 4/2008 | Lacombe | | H02M 3/156 |
| | | | | 323/282 |
| 2008/0297122 A1 | 12/2008 | Zhou et al. | | |
| 2010/0253309 A1* | 10/2010 | Xi | | H02M 3/156 |
| | | | | 323/288 |
| 2010/0327835 A1* | 12/2010 | Archibald | | H05B 33/0818 |
| | | | | 323/282 |
| 2011/0018515 A1* | 1/2011 | McCloy-Stevens | | |
| | | | | H02M 3/1588 |
| | | | | 323/284 |
| 2011/0062929 A1 | 3/2011 | Strydom et al. | | |
| 2012/0049810 A1* | 3/2012 | Huang | | G05F 1/46 |
| | | | | 323/271 |
| 2014/0266110 A1* | 9/2014 | Yuan | | H02M 3/156 |
| | | | | 323/282 |
| 2015/0022172 A1* | 1/2015 | Hari | | H02M 3/156 |
| | | | | 323/282 |
| 2015/0244262 A1* | 8/2015 | Ouyang | | H02M 3/158 |
| | | | | 323/283 |
| 2016/0259355 A1* | 9/2016 | Farber | | H03K 5/2481 |
| 2016/0301303 A1* | 10/2016 | Bari | | H02M 3/156 |
| 2016/0365791 A1 | 12/2016 | Childs et al. | | |
| 2017/0085168 A1* | 3/2017 | Laur | | H02M 3/158 |
| 2017/0373594 A1* | 12/2017 | Childs | | H02M 1/08 |

\* cited by examiner

COMPENSATION RAMP OFFSET REMOVAL

RELATED PATENT APPLICATIONS

This application is related to U.S. application Ser. No. 15/189,210, filed on Jun. 22, 2016, which is owned by a common assignee and is herein incorporated by reference in its entirety. This application is also related to German application DE 10 2016 217 857.1, filed on Sep. 19, 2016, which is owned by a common assignee and is herein incorporated by reference in its entirety.

BACKGROUND

Field

The disclosure relates generally to Buck, Boost, Buck-Boost and other types of DC-DC switching power converters, operating in peak-mode and valley-mode current control, employing a compensation ramp.

Description of Related Art

In a direct-current mode control scheme for a DC-DC switching converter, a compensation ramp is added to the current signal in order to prevent sub-harmonic oscillation. For peak-mode control, a high side device is turned on with the clock, the coil current is then directly compared to a current-limit threshold, and the high side device is turned off when this limit is hit. A valley-mode implementation turns a low side device on with the clock, and turns the low side device off when the coil current falls below a lower threshold-current limit.

In each case the threshold-current, which is a variable current limit in peak-mode implementation, is controlled to be proportional to the output voltage error such that Icontrol=k·(Vtarget−Vout), where k is the arbitrary constant of proportionality. The control current is proportional to the voltage error (Vtarget−Vout) and k indicates the gain of this function. In reality k is the transconductance (gm) of the switching converter and is chosen to give the desired overall behavior of the switching converter. In order to provide a compensation ramp, a fixed current ramp is added to the control current on a cycle-by-cycle basis. In peak-mode implementation, the current threshold is reduced over a cycle. In the valley mode implementation, the current threshold is increased over a cycle.

Figure 1:
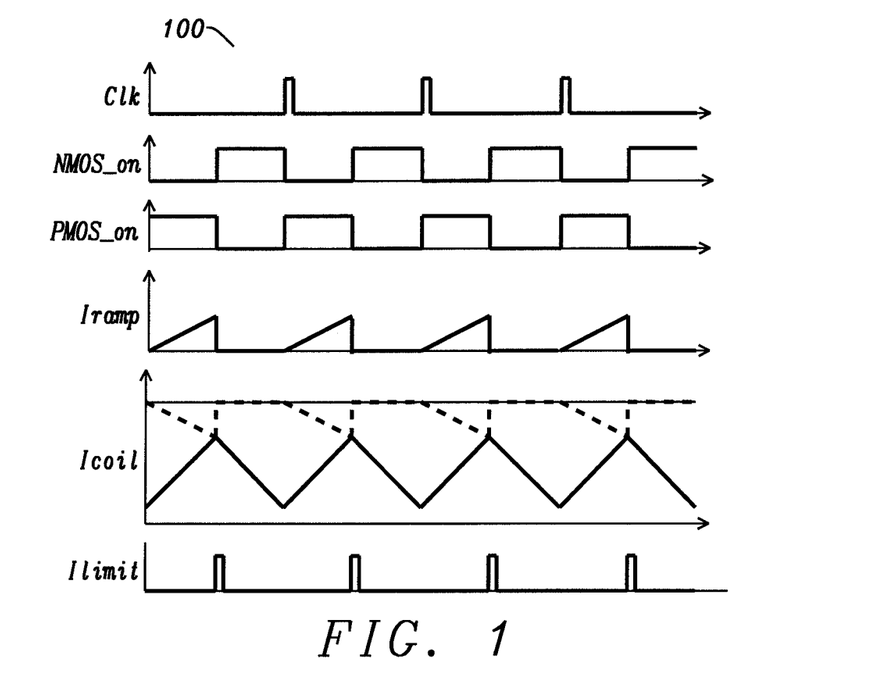
FIG. 1 illustrates a direct current-mode control scheme for peak-mode control, where the high side device is turned on with a clock, a coil current is compared to a current-limit threshold, and the high side device is turned off with the limit, of the prior art.

FIG. 1 illustrates direct current-mode control scheme 100 for peak-mode control, where the high side device is turned on with a clock, a coil current is compared to a current-limit threshold, and the high side device is turned off with the limit, of the prior art. High side device PMOS_ON is turned on with clock CLK, and coil current ICOIL ramps up linearly. At the same time, the ramp generator creates a fixed internal ramp current IRAMP. The overall control circuitry determines control current 110, created by an operational transconductance amplifier (OTA) current, proportional to the output voltage error. The compensation ramp is subtracted from this control current. The resulting sum of these two currents, 120, establishes the instantaneous value of the variable current limit. When the coil current reaches this limit, flag ILIMIT is raised, turning PMOS_ON off and NMOS_ON on.

For a given duty-cycle this compensation ramp adds an offset to the control current, so that the actual peak current achieved for peak-mode, or valley current achieved for valley-mode, is not the same as the control current. Ipeak=k·(Vtarget−Vout)−Sramp·Ton, where Sramp·Ton represents the offset to the control current. This can cause issues for the DC-DC switching converter.

In peak-mode, the principle issues are peak-current limiting and phase balancing. In the case of peak-current limiting, a very accurate peak-current limit is required. This is achieved by limiting the maximum value of the control current, thereby limiting the maximum value of the peak current, as the high side device will turn off whenever the coil current exceeds this value. However, the current offset introduced by the compensation ramp will shift the actual peak current achieved so it is no longer the same as the control current. This effect is duty-cycle dependent and a variable error.

In the case of phase balancing for peak-mode, for DC-DC converters having multiple phases, the current per-phase must be controlled carefully to make sure each phase is providing the correct proportion of the total output current. This can be achieved by balancing the control current for each phase. Each phase will then have a well-controlled peak current, with respect to each of the other phases. The offset due to the compensation ramp will shift the current of each phase compared to the control current, unbalancing the phase currents. It cannot be assumed the offset due to the compensation ramp will be the same for all phases, as each of the phases are operated with very different conditions.

For peak-mode, the compensation ramp is proportional to the down-slope of the coil current, and for low duty-cycles this is a relatively low value slope. With low duty-cycles, the on time is short, so the amount of offset added by this slope is small. In valley-mode operation the compensation ramp adds a much larger offset for low output voltages with low duty-cycles, while the effect is inverted for high output voltage and high-duty cycles.

In valley-mode, the compensation slope added is proportional to the rising slope of the coil current. For low duty-cycles the value of the rising slope in the coil current is very large. The compensation ramp is added during the low side device on time. A larger compensation ramp is added for a longer time, and the offset added in valley-mode is typically much larger than that in peak-mode.

The magnitude of the compensation ramp added in valley-mode can cause issues in the circuit for phase balancing and with saturating the circuit. In the case of phase balancing, the offset added can be very large. If a valley-mode phase is combined with a peak-mode phase, the phase currents can be very unbalanced. The peak-mode phase current will naturally be offset below the control current, while the valley-mode current will be naturally offset above the control current. However the compensation ramp offset in the valley-mode phase can cause the phase current to be dramatically offset above the control current, to the extent that it can be difficult to compensate for.

The large offset introduced by the valley-mode compensation-ramp can be large enough that circuit elements in the valley-mode phase can saturate. This requires that the circuit elements in the valley-mode phase be dramatically over-designed to deal with currents that are well out of range of normal operation.

Figure 2:
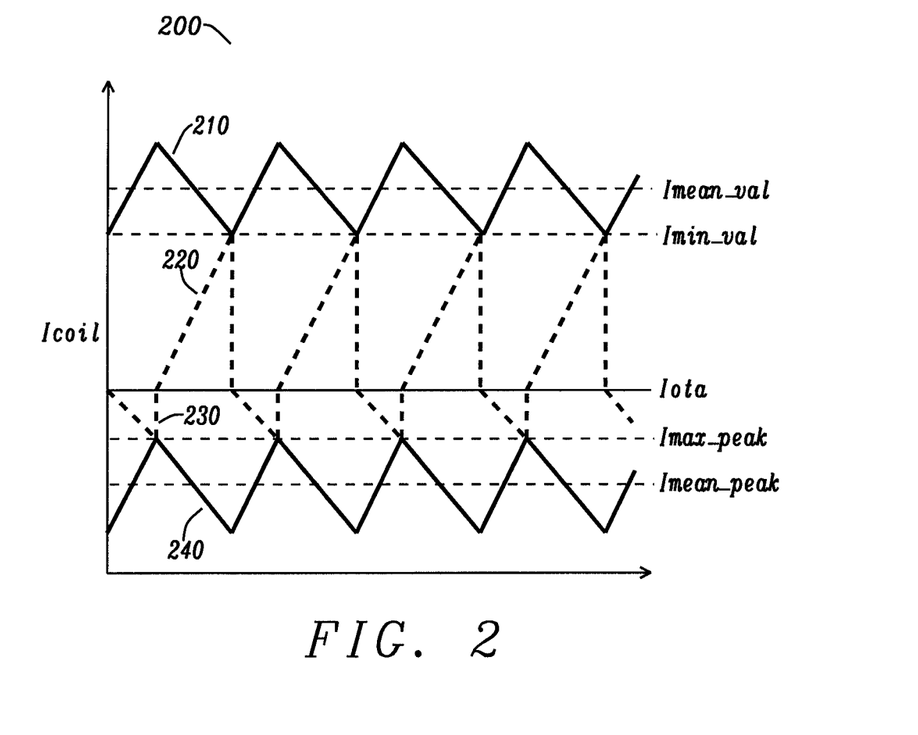
FIG. 2 shows the difference between the offsets due to the compensation ramps generated in peak-mode schemes compared to valley-mode schemes, of the prior art.

FIG. 2 shows difference 200, between the offsets due to the compensation ramps generated in peak-mode schemes compared to valley-mode schemes, of the prior art. Peak-mode waveforms are shown in 230 and 240, and the valley-mode waveforms in 210 and 220. In the both peak-mode and valley-mode, the OTA control current is shown as IOTA. The compensation ramp current is subtracted from the control current, and resulting signal 230 defines the instantaneous variable current limit for peak-mode phase current 240, which turns the high side device off and the low side device on. The difference between the peak of peak-mode coil current waveform IMAX_PEAK and control current IOTA is the effect of the compensation ramp offset.

The valley-mode control current is same OTA control current IOTA. Now the compensation ramp is added to this control current, and resulting signal 220 defines the instantaneous variable current threshold for valley-mode phase current 210, which turns the low side device off and the high side device on. The difference between the minimum current of valley-mode phase IMIN_VAL and control current IOTA is the effect of the compensation ramp offset.

The analysis above is for low output voltages where the duty-cycle is short, where peak-mode has a small offset and valley-mode has a large offset added. For the alternative case, where the output voltage is high and the duty-cycle is large, then peak-mode has a high offset and valley-mode has a small offset added.

What is shown is that the effect of valley-mode offset is typically much more severe than peak-mode offset. When peak-mode phases are combined with valley-mode phases, using the same OTA control current for both types of phases, issues can result in the design of the system.

SUMMARY

An object of the disclosure is to provide the removal of the offset effect of the compensation ramp current in a direct-current mode control scheme for a DC-DC switching converter.

A further object of the disclosure is to provide the removal of the offset effect of the compensation ramp current in a direct-current mode control scheme for a DC-DC switching converter at very high switching frequencies.

Further, another object of this disclosure is to sample the value of the compensation ramp immediately before the high side device turns off, in a peak-mode scheme, to establish an offset current equal and opposite to the sampled value, to balance the effect of the compensation ramp current.

Still further, another object of this disclosure is to sample the value of the compensation ramp immediately before the low side device turns off, in a valley-mode scheme, to establish an offset current equal and opposite to the sampled value, to balance the effect of the compensation ramp current.

To accomplish the above and other objects, a DC-DC switching converter is disclosed, configured for a direct-current mode current limit, with peak-mode control circuitry, configured to compare a coil current to a variable current limit, to turn off a high side device when the coil current exceeds the variable current limit. The DC-DC switching converter further comprises a compensation ramp generator, configured to provide a compensation ramp signal, and an offset circuit, configured to provide an offset current. The DC-DC switching converter still further comprises an amplifier, configured to generate a control current proportional to the difference between an output voltage and a target voltage, and an adder, to combine the control current, the compensation ramp signal, and the offset current. The DC-DC switching converter still further comprises a current mirror connected to the compensation ramp generator, and configured to provide a replica of the compensation ramp signal. The offset circuit comprises a sampling circuit, configured to sample the compensation ramp signal when the high side device is turned off, to generate the offset current. The offset current is equal and opposite of the compensation ramp signal and is added to the compensation ramp signal during a next cycle, to remove an offset effect of the compensation ramp signal. The DC-DC switching converter also comprises valley-mode control circuitry, configured to compare a coil current to a variable current limit, to turn off a low side device when the coil current falls below the variable current limit, and an offset circuit configured to sample the compensation ramp signal when the low side device is turned off. In the valley-mode case, the offset current is subtracted from the compensation ramp signal during a next cycle, to remove an offset effect of said compensation ramp signal.

The above and other objects are further achieved by a method for removal of compensation ramp offset current, in a DC-DC switching converter. The steps include providing peak-mode control circuitry for comparing a coil current to a variable current limit, to turn off a high side device when the coil current exceeds the variable current limit, providing a compensation ramp signal, and providing an offset current. The steps also include generating a control current proportional to the difference between an output voltage and a target voltage, and combining the control current, the compensation ramp signal, and the offset current. The steps also include providing valley-mode control circuitry for comparing a coil current to a variable current limit, to turn off a low side device when said coil current falls below the variable current limit, providing a compensation ramp signal, and providing an offset current. The steps also include generating a control current proportional to the difference between an output voltage and a target voltage, and combining the control current, the compensation ramp signal, and the offset current.

In various embodiments the function may be achieved using a Buck, Boost, or Buck-Boost DC-DC switching converter.

In various embodiments the function may be achieved using a PMOS high side device.

In various embodiments the function may be achieved using a NMOS low side device.

In various embodiments, the function may be achieved with a current sample-and-hold circuit, configured to store a voltage level of an offset circuit across a sampling capacitor through a switch.

In various embodiments, the function may be achieved with a first current mirror configured to provide the compensation ramp signal to the peak-mode control circuitry, a second current mirror configured to provide the offset current, a comparator used to compare voltages proportional to the compensation ramp signal and the offset current, a counter configured to increment or decrement the offset current each cycle, and a programmable current source, configured to generate the offset current. In this embodiment, the counter reads the output of the comparator at the point when the high side device turns off and the programmable current source is configured to a value controlled by the output of the counter.

In various embodiments, the function may be achieved with a first current mirror configured to provide the compensation ramp signal to the valley-mode control circuitry, a second current mirror configured to provide the offset current, a comparator used to compare voltages proportional to the compensation ramp signal and the offset current, a counter configured to increment or decrement the the current each cycle, and a programmable current source, configured to generate the offset current. In this embodiment, the counter reads the output of the comparator at the point when the low side device turns off and the programmable current source is configured to a value controlled by the output of the counter.

DETAILED DESCRIPTION

As disclosed in U.S. application Ser. No. 15/189,210, filed on Jun. 22, 2016, a multi-phase DC-DC switching converter sometimes contains both peak-mode phases and valley-mode phases. And as disclosed in German application DE 10 2016 217 857.1, filed on Sep. 19, 2016, a DC-DC switching converter may have a peak current servo, consisting of a high side and a low side device, where the peak high side device current is sampled just before the point when the high side device switches off. The disclosure provides the removal of the offset effect of the compensation ramp current in a direct-current mode control scheme for a DC-DC switching converter. In one embodiment, this is achieved by sampling the value of the compensation ramp immediately before the high side device turns off, in a peak-mode scheme, to establish adding to the control current a current equal and opposite to the sampled value, to balance the offset added by the compensation ramp. In another embodiment, the value of the compensation ramp is sampled immediately before the low side device turns off, in a valley-mode scheme, to establish subtracting from the control current a current equal and opposite to the sampled value, to balance the offset added by the compensation ramp.

In a DC-DC switching converter with direct-current control and a peak-mode scheme, the high side device is turned off when the coil current exceeds the variable current limit. In order to prevent sub-harmonic oscillation, a fixed compensation ramp must be subtracted from the control current over each cycle. This then adds an offset to the actual peak coil current achieved. To remove this offset, the compensation ramp current must be sampled at the point when the high side device is turned off. This value is added back onto the control current, removing the offset effect of the compensation ramp, without removing the beneficial stabilizing effect. In a valley-mode scheme, the compensation ramp current must be sampled at the point when the low side device is turned off when the coil current falls below a threshold current limit.

The circuit that creates the compensation ramp current must be provided with a second output, a replica of the compensation ramp current. This current can then be provided to a sampling circuit, and at the point when the high side is turned off, the replica compensation ramp current sampled. A static current, set to this final value of the compensation ramp current, can then be added to the control current during the next cycle, to remove the offset effect of the compensation ramp current.

Figure 7:
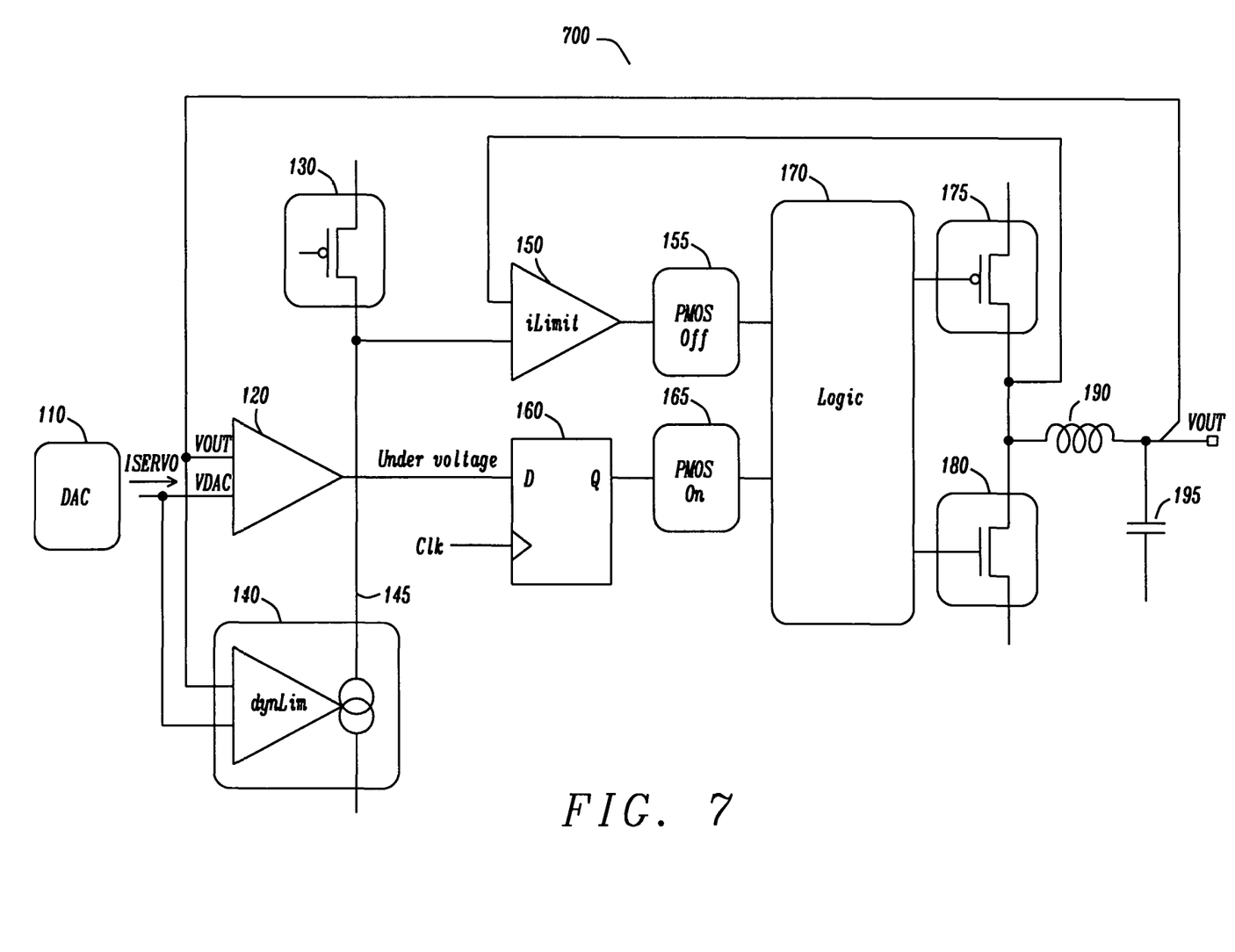
FIG. 7 is a circuit diagram illustrating a peak current mode Buck switching converter, where the peak PMOS current limit is proportional to the output voltage error.

FIG. 7 is circuit diagram 100, which illustrates a peak current mode Buck switching converter, where peak PMOS current limit 145 is proportional to the output voltage error. High side device 175 is turned on with control 165, through logic 170, each cycle by the clock. The high side device is then turned off with control 155, by current limit 150. When the high side device is turned off, low side device 180 is turned on through logic 170, each cycle by the clock. The current limit is controlled by OTA DYNLIM 140, which compares the buck target reference voltage VDAC, from DAC 110, with the output feedback voltage VOUT, across capacitor 195. OTA current limit 140 serves to control the peak coil current, through inductor 190. Under-voltage comparator 120 provides pulse skipping to the clock in latch 160, when the load is very low.

Figure 3:
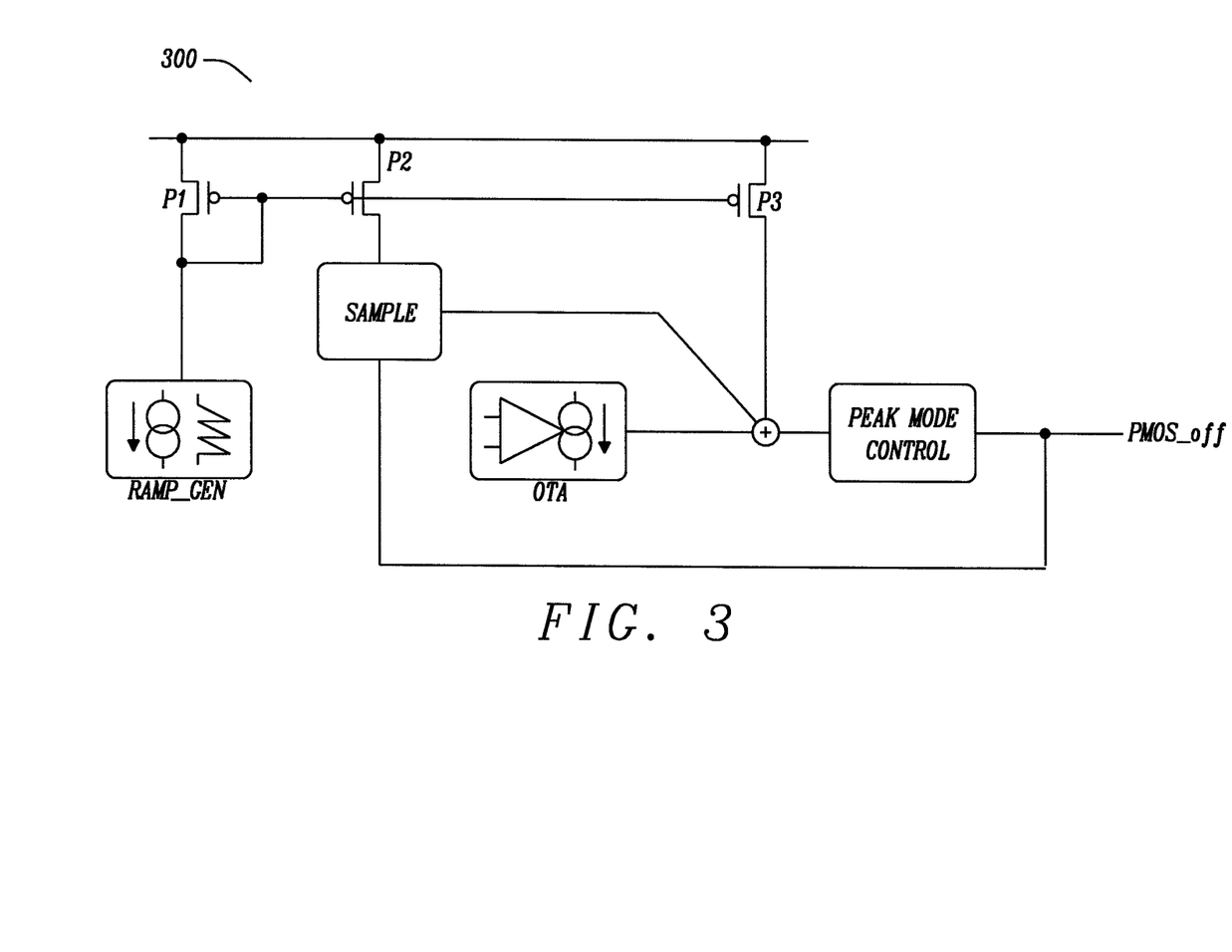
FIG. 3 illustrates a simplified block diagram, where, an operational transconductance amplifier (OTA) outputs a current proportional to the difference between the output voltage and a target voltage, and a sampled current is added to the OTA current, eliminating the offset effect of the compensation ramp, embodying the principles of the disclosure.

FIG. 3 illustrates simplified block diagram 300, where, an operational transconductance amplifier (OTA) outputs a current proportional to the difference between the output voltage and a target voltage, and a sampled current is added to the OTA current, eliminating the offset effect of the compensation ramp, embodying the principles of the disclosure. PMOS devices P1, P2 and P3 form a current mirror, with two matched outputs from P2 and P3. The OTA outputs a current proportional to the difference between the output voltage and the target voltage. This is the main element of the control loop, defining the overall transconductance of the system. The OTA output is input to the Peak-Mode Control circuitry, which compares the coil current to the control current at its input. When the coil current exceeds the control current at its input, the peak-mode control circuitry turns off the PMOS device, in PMOS_OFF. The compensation ramp is generated by the circuitry in RAMP_GEN, and this current is then input to the current mirror. The main branch of this current mirror, P3, is then subtracted from the OTA current, to compensate the circuit. A replica of this current is also output, from P2, to the current sampling in SAMPLE. This samples the replica current at the point when PMOS_OFF is triggered. The sample then outputs this sampled current until the next time it is triggered. This sampled current is added to the OTA current to eliminate the offset effect of the compensation ramp current.

While an OTA may be used, an alternative embodiment of the disclosure is to use a voltage mode error amplifier, and to convert all sensed current signals to voltages, and then do all of the comparisons in the voltage domain. In the proposal, the offset effect of the compensation ramp current is eliminated. Note that the compensation ramp signal may be either a current or a voltage signal.

Figure 4:
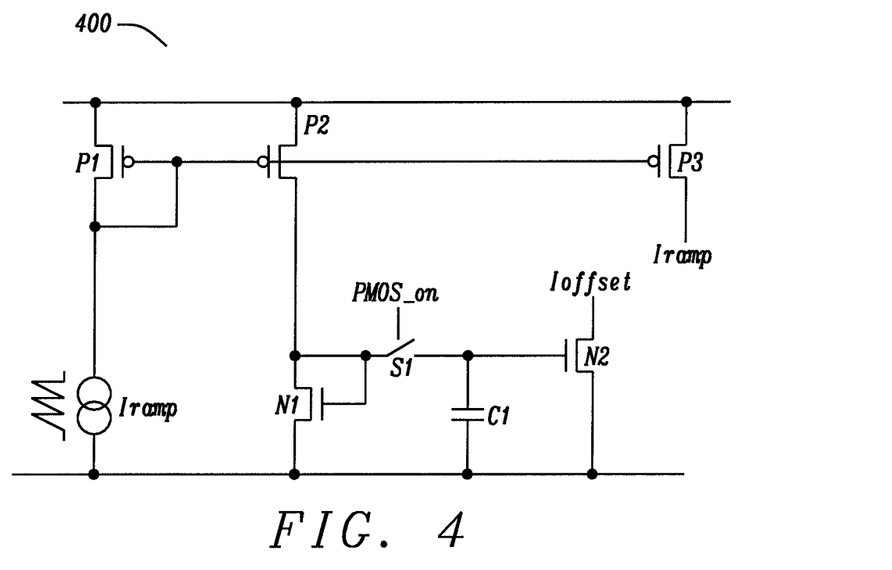
FIG. 4 shows a possible embodiment of a current sample-and-hold circuit, where a replica of the compensation ramp current is provided across a sampling capacitor through a switch, embodying the principles of the disclosure.

FIG. 4 shows possible embodiment 400, of a current sample-and-hold circuit, where a replica of the compensation ramp current is provided across a sampling capacitor through a switch, embodying the principles of the disclosure. In this scheme the ramp current is generated with IRAMP and input to a current mirror with two outputs, from devices P1, P2 and P3. The main compensation ramp current IRAMP is output from the main mirror device P3. A matched replica of this current is also provided on P2 to NMOS device N1 connected to a sampling capacitor C1 through switch S1. When PMOS_ON is on, and the compensation current is ramping, the switch is closed and the gate voltage of N1 is routed to the sampling capacitor. When the PMOS turns off, the switch opens and the final gate voltage of N1 is held on the gate of output NMOS device N2. This will output a current equal to the final value of the compensation ramp, in IOFFSET.

An alternative to a true measure-and-replicate circuit is to use a slow varying current source to remove the compensation ramp offset effect. As the offset effect of the compensation ramp is proportional to the duty cycle, it is reasonable to assume it will not vary greatly from cycle to cycle in steady state operation. It is therefore possible to implement a potentially simpler scheme to remove the offset.

In this scheme the value of the compensation ramp is again sampled at the point when the high side device turns off. This is then compared directly with the offset current being added to the control current. This comparison will indicate whether the offset current being added is larger, or smaller, than required removing the offset effect of the compensation ramp. A counter may be used to increment or decrement the offset current each cycle. Over many cycles the offset current will therefore be adjusted to match that required to remove the offset effect of the compensation ramp.

This scheme eliminates the requirement to directly replicate the sensitive compensation ramp current each cycle. It will help prevent fast cycle-per-cycle sub-harmonic effects that may potentially be created.

Figure 5:
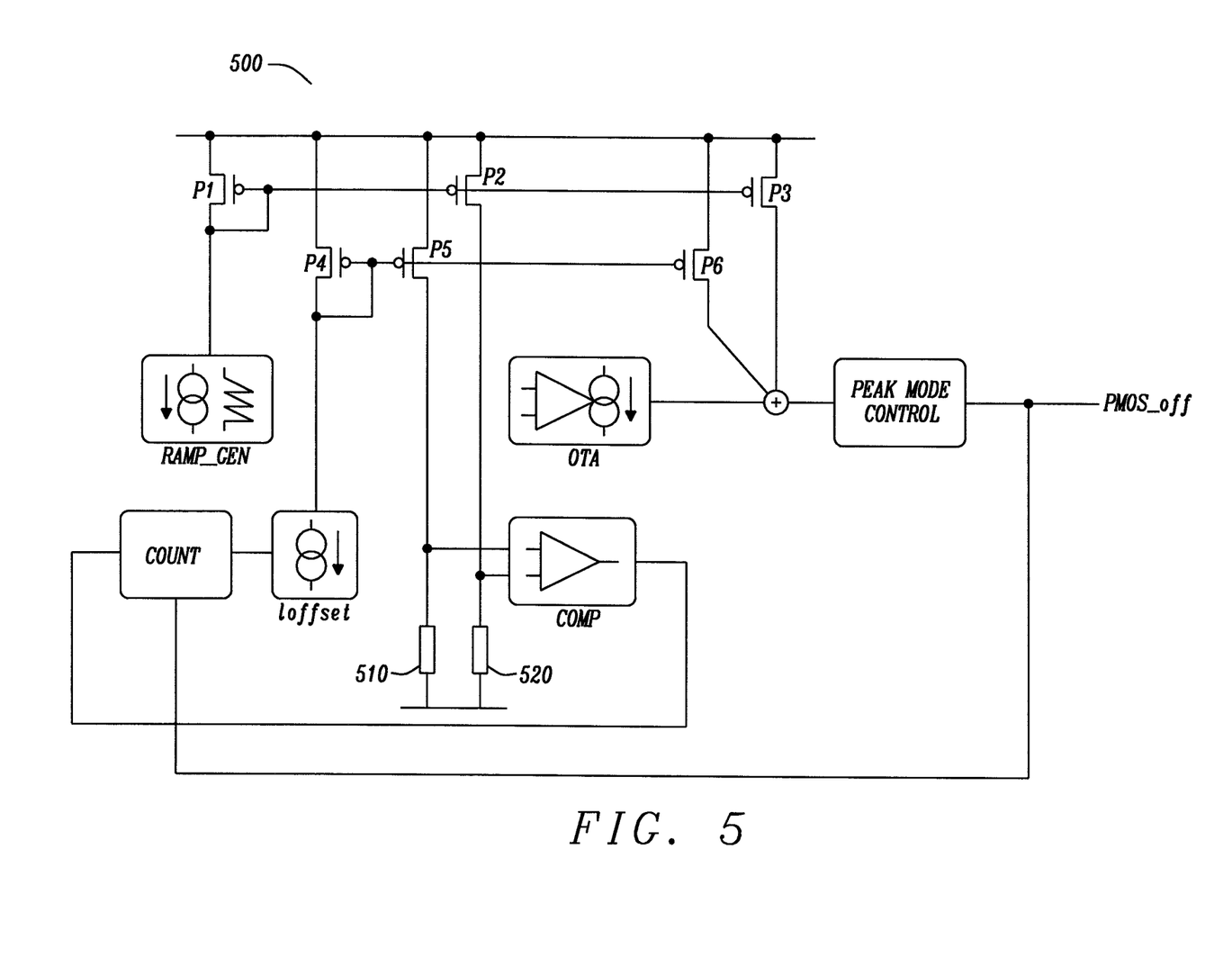
FIG. 5 illustrates a slow servo method, where the compensation ramp offset current is generated by a programmable current source, the value of which is controlled by the output of a counter, embodying the principles of the disclosure.

FIG. 5 illustrates slow servo method 500, where the compensation ramp offset current is generated by a programmable current source, the value of which is controlled by the output of a counter, embodying the principles of the disclosure. Again the OTA defines the main control current, and the ramp current is generated by RAMP_GEN. Devices P1, P2 and P3 comprise a dual-output current mirror. The compensation ramp current, on P3, is subtracted from the OTA current, and then input to the Peak-Mode Control circuitry. The offset current is generated by programmable current source IOFFSET, the value of which is controlled by the output of COUNT. This offset current is input to another dual-output current-mirror comprising devices P4, P5 and P6. The main offset current output, P6, is added to the control current to compensate for the offset effect of the compensation ramp current. A replica of this offset current is output via P5 to resistor 510 generating a voltage proportional to the offset current.

In this scheme the replica compensation ramp current is output via P2 to resistor 520, generating a voltage proportional to the compensation ramp current. This allows the offset current to be directly compared to the compensation ramp current, in COMP. At the point when the PMOS turns off, PMOS_OFF, the counter reads the output of the comparator and either increments or decrements its output value. This in turn changes the value of the offset current slightly. Over many cycles the scheme adjusts the offset current until it matches the final value of the compensation ramp current at the point when the PMOS is turned off.

Other schemes also exist which attempt to achieve the same effect. These may include schemes to monitor the total current being input to the peak-mode control circuitry, or valley-mode control circuitry, and comparing this to the OTA current. In this way, the offset current can be adjusted to make the total current input to the peak-mode control circuitry at the point when the high side device turns off, or to make the total current input to the valley-mode control circuitry at the point when the low side device turns off, set to the OTA current.

The proposed disclosure is advantageous over that disclosed in German application DE 10 2016 217 857.1, filed on Sep. 19, 2016, as it removes both the effects of the compensation ramp and the current ripple in the coil. Because error can be introduced by the valley-mode phase compensation ramp in the range >4 A, and the current ripple in the range <1 A, it can be difficult to provide the necessary range for the peak-current servo. As the proposed scheme is digital in nature, and the comparator required on the analogue side is small with low current, it is reasonable to use both implementations together if required. In this system, the compensation ramp current removal removes the bulk of the offset, and the peak current servo of DE 10 2016 217 857.1 then trims the final current to be very accurately controlled.

For DC-DC converters having on-times shorter than 10 ns, it may not be possible to compare the control current with the coil current in a the peak current servo of DE 10 2016 217 857.1. However, as the compensation ramp is entirely internal to the DC-DC switching converter in the proposed disclosure, it will be possible to measure and remove this large offset internally at very high switching frequencies.

Figure 6:
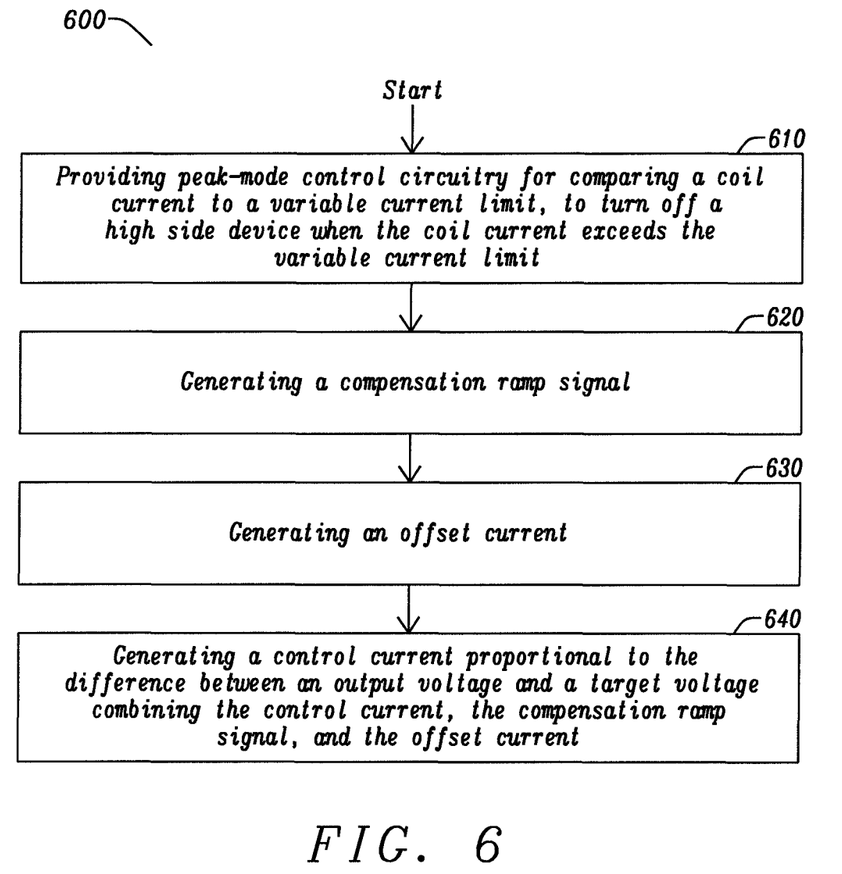
FIG. 6 is a flow chart of a method for compensation ramp offset current removal, embodying the principles of the disclosure.

FIG. 6 is flow chart 600, of a method for compensation ramp offset current removal, embodying the principles of the disclosure. The steps include 610, providing peak-mode control circuitry for comparing a coil current to a variable current limit, to turn off a high side device when the coil current exceeds the variable current limit, providing a compensation ramp current, and providing an offset current. The steps also include 620, generating a control current proportional to the difference between an output voltage and a target voltage, and combining the control current, the compensation ramp current, and the offset current. The steps also include 630, providing valley-mode control circuitry for comparing a coil current to a variable current limit, to turn off a low side device when said coil current falls below the variable current limit, providing a compensation ramp current, and providing an offset current. The steps also include 640, generating a control current proportional to the difference between an output voltage and a target voltage, and combining the control current, the compensation ramp current, and the offset current.

The advantages of one or more embodiments of the present disclosure include removal of the DC offset effect of the compensation ramp current, in a DC-DC switching converter, preventing saturation in key circuit blocks. The proposal allows for more accurate control of the coil currents, and if a secondary scheme is being used for control such as a phase balancing scheme, the proposal also reduces the range over which these circuits can work, establishing a better initial condition for their use.

While this invention has been particularly shown and described with reference to the preferred embodiments thereof, it will be understood by those skilled in the art that various changes in form and details may be made without departing from the spirit and scope of the invention.

What is claimed is:

1. A DC-DC current-control mode switching converter, comprising:
   peak-mode control circuitry, configured to compare a coil current to a variable current limit, to turn off a high side device when said coil current exceeds said variable current limit;
   a compensation ramp generator, configured to provide a compensation ramp signal with a first current mirror;
   an offset circuit, configured to provide an offset current from a second current mirror signal, comprising a sampling circuit, configured to sample said compensation ramp signal when said high side device is turned off, and to output said offset current until a next time said high side device is turned off;
   an amplifier, configured to generate a control current proportional to the difference between an output voltage and a target voltage; and
   an adder, to combine said control current, said compensation ramp signal, and said offset current.

2. The switching converter of claim 1, wherein said first current mirror is configured to provide a replica of said compensation ramp signal.

3. The switching converter of claim 1, wherein said offset current is equal and opposite to said compensation ramp signal.

4. The switching converter of claim 1, wherein said offset current is added to said compensation ramp signal during a next cycle, to remove an offset effect of said compensation ramp signal.

5. The switching converter of claim 1, wherein said sampling circuit comprises a sample-and-hold circuit, configured to store a voltage level of said offset circuit across a sampling capacitor through a switch.

6. The switching converter of claim 1, wherein said amplifier is an operational transconductance amplifier.

7. The switching converter of claim 1, wherein said amplifier is a voltage mode error amplifier.

8. The switching converter of claim 1, wherein said switching converter is a Buck, Boost, or Buck-Boost switching converter.

9. The switching converter of claim 1, wherein said high side device is a PMOS device.

10. The switching converter of claim 1, further comprising, a comparator used to compare voltages proportional to said compensation ramp signal and said offset current, a counter configured to increment or decrement said offset current each cycle, and a programmable current source, configured to generate said offset current.

11. The switching converter of claim 10, wherein said counter is configured to read the output of said comparator at the point when said high side device turns off.

12. The switching converter of claim 10 wherein said programmable current source is configured to a value controlled by the output of said counter.

13. A DC-DC current-control mode switching converter, comprising:
   valley-mode control circuitry, configured to compare a coil current to a variable current limit, to turn off a low side device when said coil current falls below said variable current limit;
   a compensation ramp generator, configured to provide a compensation ramp signal with a first current mirror;
   an offset circuit, configured to provide an offset current from a second current mirror signal, comprising a sampling circuit, configured to sample said compensation ramp signal when said low side device is turned off, and to output said offset current until a next time said low side device is turned off;
   an amplifier, configured to generate a control current proportional to the difference between an output voltage and a target voltage; and
   an adder, to combine said control current, said compensation ramp signal, and said offset current.

14. The switching converter of claim 13, wherein said first current mirror is configured to provide a replica of said compensation ramp signal.

15. The switching converter of claim 13, wherein said offset current is equal and opposite to said compensation ramp signal.

16. The switching converter of claim 13, wherein said offset current is subtracted from said compensation ramp signal during a next cycle, to remove an offset effect of said compensation ramp signal.

17. The switching converter of claim 13, wherein said sampling circuit comprises a sample-and-hold circuit, configured to store a voltage level of said offset circuit across a sampling capacitor through a switch.

18. The switching converter of claim 13, wherein said amplifier is an operational transconductance amplifier.

19. The switching converter of claim 13, wherein said amplifier is a voltage mode error amplifier.

20. The switching converter of claim 13, wherein said switching converter is a Buck, Boost, or Buck-Boost switching converter.

21. The switching converter of claim 13, wherein said low side device is an NMOS device.

22. The switching converter of claim 13, further comprising a comparator used to compare voltages proportional to said compensation ramp signal and said offset current, a counter configured to increment or decrement said offset current each cycle, and a programmable current source, configured to generate said offset current.

23. The switching converter of claim 22, wherein said counter is configured to read the output of said comparator at the point when said low side device turns off.

24. The switching converter of claim 22 wherein said programmable current source is configured to a value controlled by the output of said counter.

25. A method for removal of compensation ramp offset current, in a DC-DC switching converter, comprising the steps of:
   providing peak-mode control circuitry for comparing a coil current to a variable current limit, to turn off a high side device when said coil current exceeds said variable current limit;
   generating a compensation ramp signal with a first current mirror;
   generating an offset current from a second current mirror signal, wherein a sampling circuit samples said compensation ramp signal when said high side device is turned off, and outputs said offset current until a next time said high side device is turned off;
   generating a control current proportional to the difference between an output voltage and a target voltage; and
   combining said control current, said compensation ramp signal, and said offset current.

26. The method of claim 25, wherein said offset current is equal and opposite to said compensation ramp signal.

27. The method of claim 25, wherein said offset current is added to said compensation ramp signal during a next cycle, to remove an offset effect of said compensation ramp signal.

28. The method of claim 25, wherein a sample-and-hold circuit stores a voltage level across a sampling capacitor through a switch.

29. The method of claim 25, wherein a comparator compares voltages proportional to said compensation ramp signal and said offset current, a counter increments or decrements said offset current each cycle, and a programmable current source generates said offset current.

30. The method of claim 29, wherein said counter reads the output of said comparator at the point when said high side device turns off.

31. The method of claim 29 wherein the output of said counter controls the value of said programmable current source.

32. A method for removal of a compensation ramp offset current in a DC-DC current-control mode switching converter, comprising the steps of:
providing valley-mode control circuitry for comparing a coil current to a variable current limit, to turn off a low side device when said coil current falls below said variable current limit;
generating a compensation ramp signal with a first current mirror;
generating an offset current from a second current mirror signal, wherein a sampling circuit samples said compensation ramp signal when said low side device is turned off, and outputs said offset current until a next time said low side device is turned off;
generating a control current proportional to the difference between an output voltage and a target voltage; and
combining said control current, said compensation ramp signal, and said offset current.

33. The method of claim 32, wherein a first current mirror provides a replica of said compensation ramp signal.

34. The method of claim 32, wherein said offset current is equal and opposite to said compensation ramp signal.

35. The method of claim 32, wherein said offset current is subtracted from said compensation ramp signal during a next cycle, to remove an offset effect of said compensation ramp signal.

36. The method of claim 32, wherein a sample-and-hold circuit stores a voltage level across a sampling capacitor through a switch.

37. The method of claim 32, wherein a comparator compares voltages proportional to said compensation ramp signal and said offset current, a counter increments or decrements said offset current each cycle, and a programmable current source generates said offset current.

38. The method of claim 37, wherein said counter reads the output of said comparator at the point when said low side device turns off.

39. The method of claim 37 wherein the output of said counter controls the value of said programmable current source.

* * * * *